(12) United States Patent
Graceffo et al.

(10) Patent No.: US 11,683,205 B2
(45) Date of Patent: Jun. 20, 2023

(54) BASEBAND DATA REDUCTION AND COMPRESSION ALGORITHM

(71) Applicant: RAYTHEON COMPANY, Waltham, MA (US)

(72) Inventors: Gary M. Graceffo, Burke, VA (US); Andrew Kowalevicz, Arlington, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/380,772

(22) Filed: Jul. 20, 2021

(65) Prior Publication Data

US 2023/0033568 A1 Feb. 2, 2023

(51) Int. Cl.
*H04L 25/49* (2006.01)
*H04L 27/00* (2006.01)

(52) U.S. Cl.
CPC ...... *H04L 25/4904* (2013.01); *H04L 25/4906* (2013.01); *H04L 27/0002* (2013.01)

(58) Field of Classification Search
CPC ............ H04L 25/4904; H04L 25/4906; H04L 27/0002
USPC ........................................................ 375/262
See application file for complete search history.

(56) References Cited

U.S. PATENT DOCUMENTS

| 6,426,947 B1 * | 7/2002 | Banker | H04L 41/12 370/254 |
| 2003/0156552 A1 * | 8/2003 | Banker | H04L 25/4908 370/266 |
| 2003/0227987 A1 * | 12/2003 | Poletto | H04L 25/4904 375/360 |
| 2020/0044638 A1 * | 2/2020 | Lesso | H03K 7/08 |

* cited by examiner

*Primary Examiner* — Don N Vo
(74) *Attorney, Agent, or Firm* — Lando & Anastasi, LLP (57) ABSTRACT

A system and method for recovering encoded data from a modulated baseband signal is disclosed. Aspects and embodiments of the system and method include receiving an analog input signal representing a modulated baseband signal, counting clock cycles of a reference clock, detecting a first transition and a second transition of the analog input signal indicating a first change and a second change in the modulated baseband signal, storing a first counter value corresponding to an amount of clock cycles elapsed between the first transition and the second transition, and determining a binary-valued bit sequence corresponding to the first counter value.

25 Claims, 8 Drawing Sheets

BASEBAND DATA REDUCTION AND COMPRESSION ALGORITHM

BACKGROUND

1. Field

Embodiments of the disclosure relate generally to baseband data compression and, more particularly, to the reduction and compression of non-return-to-zero (NRZ) data and associated signal processing techniques.

2. Discussion of Related Art

Many communication systems manipulate signals to carry information. For instance, often a signal source (e.g., a laser source, RF transmitter etc.) is modulated to change various properties of emitted waveform, such as a phase of the signal to convey information. A receiver may receive and demodulate the signals to recover the information. In some cases, the information is contained in baseband data encoded in a spectrum reducing format, such as non-return-to-zero (NRZ). To recover the information, the NRZ data can be digitized, stored, and processed. However, the digitization and storage of such data can be voluminous and may require sizable amounts of storage space and processing power.

SUMMARY

Aspects and embodiments of the disclosure are directed to a method for efficiently determining and storing encoded data from an encoded baseband signal. One embodiment of a method includes receiving an encoded baseband signal, detecting a first transition of intensity of the encoded baseband signal indicating a first change in the data of the encoded baseband signal, detecting a second transition of intensity of the encoded baseband signal indicating a second change in the data of the encoded baseband signal, counting, via a counter, clock cycles of a reference clock between the first transition and the second transition, storing a first counter value corresponding to an amount of clock cycles elapsed between detecting the first transition and the second transition, determining a binary-valued bit sequence corresponding to the first counter value. Embodiments of the method include detecting a third transition of intensity of the encoded baseband signal indicating a third change in the data of the encoded baseband signal, storing a second counter value corresponding to an amount of clock cycles elapsed between the second transition and the third transition, and determining a binary-valued bit sequence corresponding to the second counter value.

Aspects and embodiment of the method include receiving the encoded baseband signal includes receiving an intensity modulated signal representing a phase of a phase modulated signal that has been output from a phase to amplitude detector.

Aspects and embodiment of the method include that the encoded baseband signal is a baseband optical signal and wherein receiving the encoded baseband signal includes receiving an intensity modulated optical signal representing a phase of a phase modulated signal that has been output from an etalon.

Aspects and embodiment of the method include detecting the first transition of the encoded baseband signal includes detecting intensity deviations from a steady state level of the intensity modulated signal.

Aspects and embodiment of the method include determining the binary-valued bit sequence corresponding to the first counter value includes dividing the first counter value by a frequency of the reference clock to provide an interval duration and multiplying the interval duration by a data rate of the encoded baseband signal.

Aspects and embodiment of the method include storing the first counter value corresponding to the amount of clock cycles elapsed between receiving the first transition and the second phase transition includes storing a 1-byte data value representing the first counter value.

Aspects and embodiment of the method include receiving the encoded baseband includes receiving an intensity modulated signal representing a phase of a phase modulated signal encoded with non-return-to-zero (NRZ) data and further comprising recovering the encoded non-return-to-zero (NRZ) data from the binary-valued bit sequence.

Aspects and embodiments of the disclosure are directed to a system for recovering encoded data from an encoded baseband signal. One embodiment of the system includes a detector having an input that receives the encoded baseband signal and that provides an output signal at an output, a reference clock circuit configured to provide a reference clock, a counter circuit configured to count clock cycles of the reference clock. a trigger circuit coupled to the output of the detector that is configured to detect at least a first transition in intensity and a second transition in intensity of the encoded baseband signal indicating a first change in data and a second change in data of the encoded baseband signal, at least one memory element configured to store a first counter value corresponding to an amount of clock cycles elapsed between receiving the first transition and the second transition, and a controller configured to determine a binary-valued bit sequence corresponding to the first counter value.

Aspects and embodiment of the system include that the trigger circuit is further configured to detect a third transition of the encoded baseband signal indicating a third change in data of the encoded baseband signal.

Aspects and embodiment of the system include that the at least one memory element is further configured to store a second counter value corresponding to an amount of clock cycles elapsed between the second transition and the third transition.

Aspects and embodiment of the system include that the controller is further configured to determine a binary-valued bit sequence corresponding to the second counter value.

Aspects and embodiment of the system include that the encoded baseband signal represents a phase of a phase modulated signal that includes encoded non-return-to-zero (NRZ) data and the encoded non-return-to-zero (NRZ) data is recovered from the binary-valued bit sequence.

Aspects and embodiment of the system include that the encoded baseband signal includes an intensity modulated signal representing a phase of a phase modulated signal that has been output from a phase to amplitude detector.

Aspects and embodiment of the system include that the encoded baseband signal is an intensity modulated optical signal representing a phase of a phase modulated signal that has been output from an etalon.

Aspects and embodiment of the system include that the trigger circuit is configured to detect the first transition in intensity and the second transition in intensity of the encoded baseband signal indicating the first change in data and a second change in data of the encoded baseband signal by detecting an intensity deviation from a steady state level of the intensity modulated signal.

Aspects and embodiment of the system include that the controller is configured to determine the binary-valued bit sequence corresponding to the first counter value by dividing the first counter value by a frequency of the reference clock to provide an interval duration and multiplying the interval duration by a data rate of the encoded baseband signal.

Aspects and embodiment of the system include that the at least one memory element is configured to store a 1-byte data value representing the first counter value.

Aspects and embodiment of the system include that the at least one of the reference clock circuit, the counter circuit, and the trigger circuit is implemented on the controller.

Aspects and embodiments of the disclosure are directed to non-transitory computer readable medium comprising code which, when executed by at least one processor, controls the at least one processor to process a detected signal provided by a detector detected from an input encoded baseband signal. determine from the detected signal a first transition in intensity of the encoded baseband signal indicating a first change in data of the encoded signal, determine from the detected signal a second transition in intensity of the encoded baseband signal indicating a second change in data the encoded baseband signal, count, via a counter, clock cycles of a reference clock, store a first counter value corresponding to an amount of clock cycles elapsed between receiving the first transition and the second transition, and determine a binary-valued bit sequence corresponding to the first counter value.

Aspects and embodiment of the non-transitory computer readable medium include that the code, when executed by the at least one processor, further controls the at least one processor to detect a third transition of the detected signal indicating a third change in data of the encoded baseband signal. store a second counter value corresponding to an amount of clock cycles elapsed between the second transition and the third transition, and determine a binary-valued bit sequence corresponding to the second counter value.

Aspects and embodiment of the non-transitory computer readable medium include that the code, when executed by the at least one processor, further controls the at least one processor to detect the first transition and the second transition of the encoded baseband signal by detecting intensity deviations from a steady state level of the intensity modulated signal.

Aspects and embodiment of the non-transitory computer readable medium include that the encoded baseband signal includes encoded non-return-to-zero (NRZ) data and wherein the code, when executed by the at least one processor, controls the at least one processor recover the encoded non-return-to-zero (NRZ) data from the binary-valued bit sequence.

Aspects and embodiment of the non-transitory computer readable medium include that the code, when executed by the at least one processor, further controls the at least one processor to determining the binary-valued bit sequence corresponding to the first counter value by dividing the first counter value by a frequency of the reference clock to provide an interval duration and multiplying the interval duration by a data rate of the encoded baseband signal.

Aspects and embodiment of the non-transitory computer readable medium include that the code, when executed by the at least one processor, further controls the at least one processor to store the first counter value corresponding to the amount of clock cycles elapsed between detecting the first transition and the second transition as a 1-byte data value representing the first counter value.

Aspects and embodiments of the disclosure are directed to a method for efficiently determining and storing encoded data from an encoded baseband signal. One embodiment of a method includes receiving an analog input signal representing an encoded baseband signal, detecting a first transition of intensity of the analog input signal indicating a first change in the encoded baseband signal, detecting a second transition of intensity of the analog input signal indicating a second change in the encoded baseband signal, counting, via a counter, clock cycles of a reference clock between the first transition and the second transition, storing a first counter value corresponding to an amount of clock cycles elapsed between detecting the first transition and the second transition, and determining a binary-valued bit sequence corresponding to the first counter value.

Aspects and embodiment of the method include detecting a third transition of intensity of the analog input signal indicating a third phase change in the encoded baseband signal, storing a second counter value corresponding to an amount of clock cycles elapsed between the second transition and the third transition, and determining a binary-valued bit sequence corresponding to the second counter value.

Aspects and embodiment of the method include that receiving the analog input signal representing the phase of the phase modulated signal includes receiving an intensity modulated signal output from a phase to amplitude detector.

Aspects and embodiment of the method include the phase modulated signal is a baseband optical signal and wherein receiving the analog input signal representing the phase of the phase modulated signal includes receiving an intensity modulated signal output from an etalon.

Aspects and embodiment of the method include that detecting the first transition of the analog input signal includes detecting intensity deviations from a steady state level of the intensity modulated signal.

Aspects and embodiment of the method include determining the binary-valued bit sequence corresponding to the first counter value includes dividing the first counter value by a frequency of the reference clock to provide an interval duration and multiplying the interval duration by a data rate of the phase modulated signal.

Aspects and embodiment of the method include storing the first counter value corresponding to the amount of clock cycles elapsed between receiving the first transition and the second phase transition includes storing a 1-byte data value representing the first counter value.

Aspects and embodiment of the method include that the analog input signal representing the phase of the phase modulated signal includes encoded non-return-to-zero (NRZ) data and further comprising recovering the encoded data from the binary-valued bit sequence.

Aspects and embodiments of the disclosure are directed to a system for recovering encoded data from an encoded baseband signal. One embodiment of the system includes a detector having an input that receives an analog input signal representing a phase of a phase modulated signal and that provides an output signal at an output. a reference clock circuit configured to provide a reference clock, a counter circuit configured to count clock cycles of the reference clock, a trigger circuit coupled to the output of the detector that is configured to detect at least a first transition and a second transition of the analog input signal indicating a first phase change and a second phase change in the phase modulated signal, at least one memory element configured to store a first counter value corresponding to an amount of clock cycles elapsed between receiving the first transition and the second transition; and a controller configured to determine a binary-valued bit sequence corresponding to the first counter value.

Aspects and embodiment of the system include that the trigger circuit is further configured to detect a third transition of the analog input signal indicating a third phase change in the phase modulated signal.

Aspects and embodiment of the system include that the analog input signal representing the phase of the phase modulated signal is an intensity modulated signal output from a phase to amplitude detector.

Aspects and embodiment of the system include that the phase modulated signal is a baseband optical signal and wherein receiving the analog input signal representing the phase of the phase modulated signal includes receiving an intensity modulated signal output from an etalon.

Aspects and embodiment of the system include that the trigger circuit is configured to detect the first transition and the second transition of the analog input signal indicating the first phase change and the second phase change in the phase modulated signal by detecting an intensity deviation from a steady state level of the intensity modulated signal.

Aspects and embodiment of the system include that the controller is configured to determine the binary-valued bit sequence corresponding to the first counter value by dividing the first counter value by a frequency of the reference clock to provide an interval duration and multiplying the interval duration by a data rate of the phase modulated signal.

Aspects and embodiment of the system include that the at least one memory element is configured to store a 1-byte data value representing the first counter value.

Aspects and embodiment of the system include that the at least one of the reference clock circuit, the counter circuit, and the trigger circuit is implemented on the controller.

Aspects and embodiments of the disclosure are directed to non-transitory computer readable medium comprising code which, when executed by at least one processor, controls the at least one processor to process a detected signal provided by a detector that corresponds to an analog input signal that represents a phase of a phase modulated signal, determine from the detected signal a first transition of the analog input signal indicating a first phase change in the phase modulated signal, determine from the detected signal a second transition of the analog input signal indicating a second phase change in the phase modulated signal, count, via a counter, clock cycles of a reference clock, store a first counter value corresponding to an amount of clock cycles elapsed between receiving the first transition and the second transition, and determine a binary-valued bit sequence corresponding to the first counter value.

Aspects and embodiment of the non-transitory computer readable medium include that the code, when executed by the at least one processor, further controls the at least one processor to detect a third transition of the detected signal indicating a third phase change in the phase modulated signal, store a second counter value corresponding to an amount of clock cycles elapsed between the second transition and the third transition, and determine a binary-valued bit sequence corresponding to the second counter value.

Aspects and embodiment of the non-transitory computer readable medium include that the code, when executed by the at least one processor, further controls the at least one processor to detect the first transition and the second transition of the analog input signal by detecting intensity deviations from a steady state level of the intensity modulated signal.

Aspects and embodiment of the non-transitory computer readable medium include that the analog input signal representing the phase of the phase modulated signal includes encoded non-return-to-zero (NRZ) data and wherein the code, when executed by the at least one processor, controls the at least one processor recover the encoded non-return-to-zero (NRZ) data from the binary-valued bit sequence.

Aspects and embodiment of the non-transitory computer readable medium include that the code, when executed by the at least one processor, further controls the at least one processor to determining the binary-valued bit sequence corresponding to the first counter value by dividing the first counter value by a frequency of the reference clock to provide an interval duration and multiplying the interval duration by a data rate of the phase modulated signal.

Aspects and embodiment of the non-transitory computer readable medium include that the code, when executed by the at least one processor, further controls the at least one processor to store the first counter value corresponding to the amount of clock cycles elapsed between receiving the analog input signal and detecting the first transition as a 1-byte data value representing the first counter value.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

As described above, many communication systems manipulate signals to carry information. For instance, often a signal source (e.g., a laser source or RF transmitter) is modulated to change various properties of the carrier, such as a phase of the carrier to convey information. A receiver may receive and demodulate the signals to recover the information. In some cases, the information is contained in baseband data encoded in a spectrum reducing format, such as non-return-to-zero (NRZ), as discussed further below. To store the NRZ signal for post collection processing, the NRZ signal can be digitized, stored, and then processed post collection. However, the digitization and storage of such data can be voluminous and may require sizable amounts of storage space and processing power. Accordingly, aspects and examples described herein provide improved apparatuses, systems, and methods for reducing and compressing the information such as, for example, non-return-to-zero (NRZ) data.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all the described terms. Any references to front and back, left and right, top and bottom, upper and lower, and vertical and horizontal are intended for convenience of description, not to limit the present systems and methods or their components to any one positional or spatial orientation. The term signal or waveform, may be used interchangeably herein and refer generally to an electromagnetic signal that propagates through a given medium, which may be empty space, e.g., a vacuum, or may be an atmospheric, e.g., air, or other medium, such as fiber or other optics components. The terms signal or waveform are not meant to imply any particular characteristic of the electromagnetic wave, such as frequency or wavelength, band, coherency, spectral density, quality factor, etc., and may include radio waves, microwaves, infrared, visible, and/or ultraviolet electromagnetic radiation, or other non-ionizing electromagnetic radiation. 15, Aspect and embodiments of this disclosure are directed to the compression of a baseband signal for more efficient storage. Aspects and embodiments are directed to any receiving a time domain signal that has been converted from a modulated signal to an intensity modulated signal. Aspects and embodiments are directed to any receiving an encoded baseband signal that has been converted from a phase modulated signal to an intensity modulated signal. The disclosure is independent of the originating carrier signal such as whether it is a light signal, an RF signal, or any frequency or wavelength. As will be discussed in relation to FIG. 3, aspect and embodiments include receiving a time domain signal that has been converted from a modulated signal to square waves. As will be shown with reference to FIGS. 1-2, aspects and embodiments include providing a light signal for example by a laser system, converting a phase modulated light signal to an intensity modulated signal, for example, by using an etalon or other cavity resonator, and converting the intensity modulated signal output by the cavity resonator with a detector. Alternatively, for a modulated electromagnetic signal such as an RF signal, converting the modulated signal to an intensity modulated signal can be done, for example, for a phase modulated signal with a phase to amplitude detector. Regardless of the frequency, wavelength and modulations of the modulated signal and the apparatus for converting the modulated signal to an intensity modulation signal, such as a square wave, aspects and embodiments of the disclosure are directed to receiving a modulated baseband signal, such as time domain pulses as shown in FIG. 3, storing data corresponding to the modulated baseband encoded signal, and determining a binary-valued bit sequence from the stored data. Aspects and embodiments are also directed to compressing the data to be stored to the data corresponding to the modulated baseband signal to minimize the amount of data to be stored.

Figure 1:
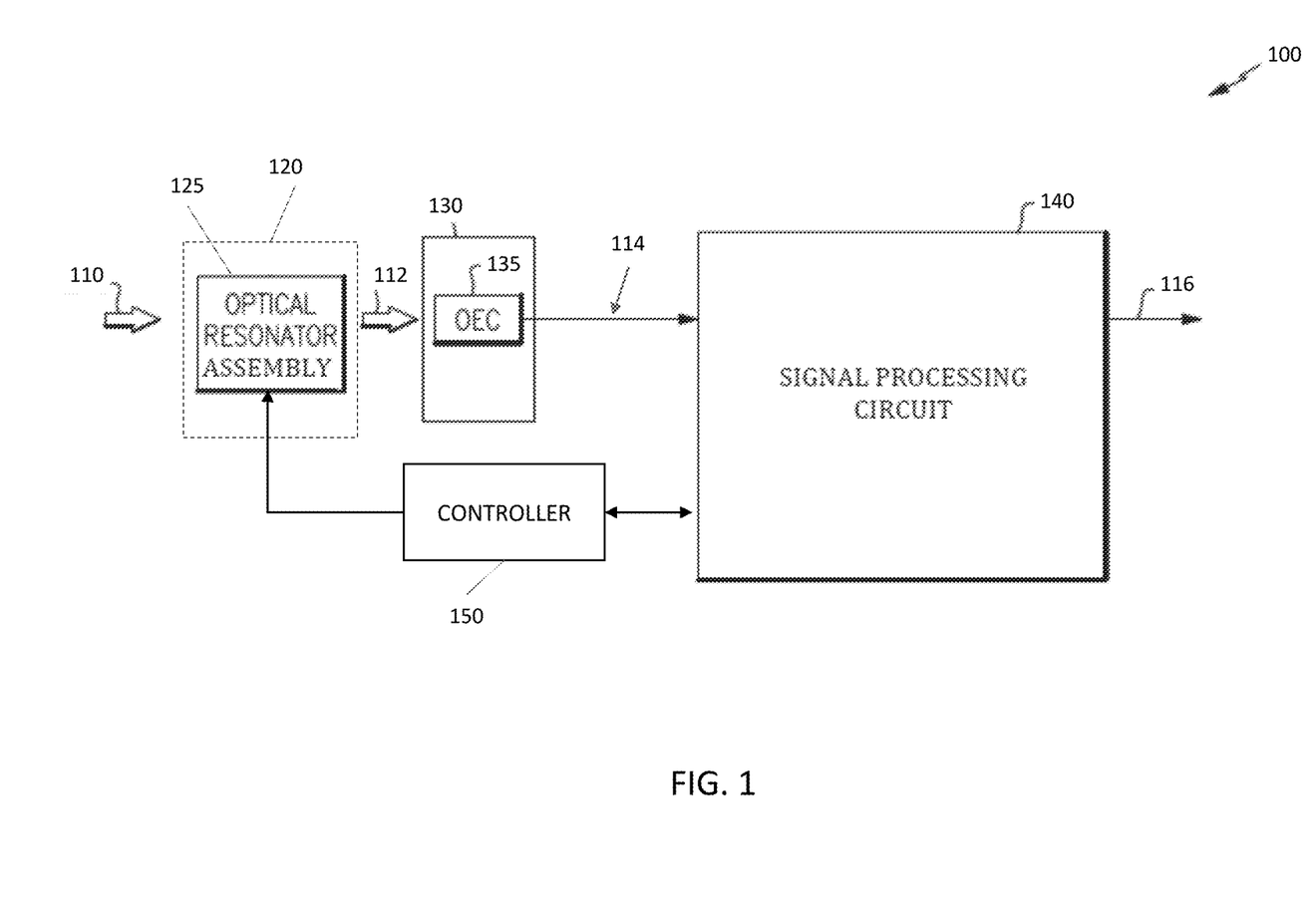
FIG. 1 is a functional block diagram of one example of an optical receiver in accordance with aspects described herein.
Figure 2:
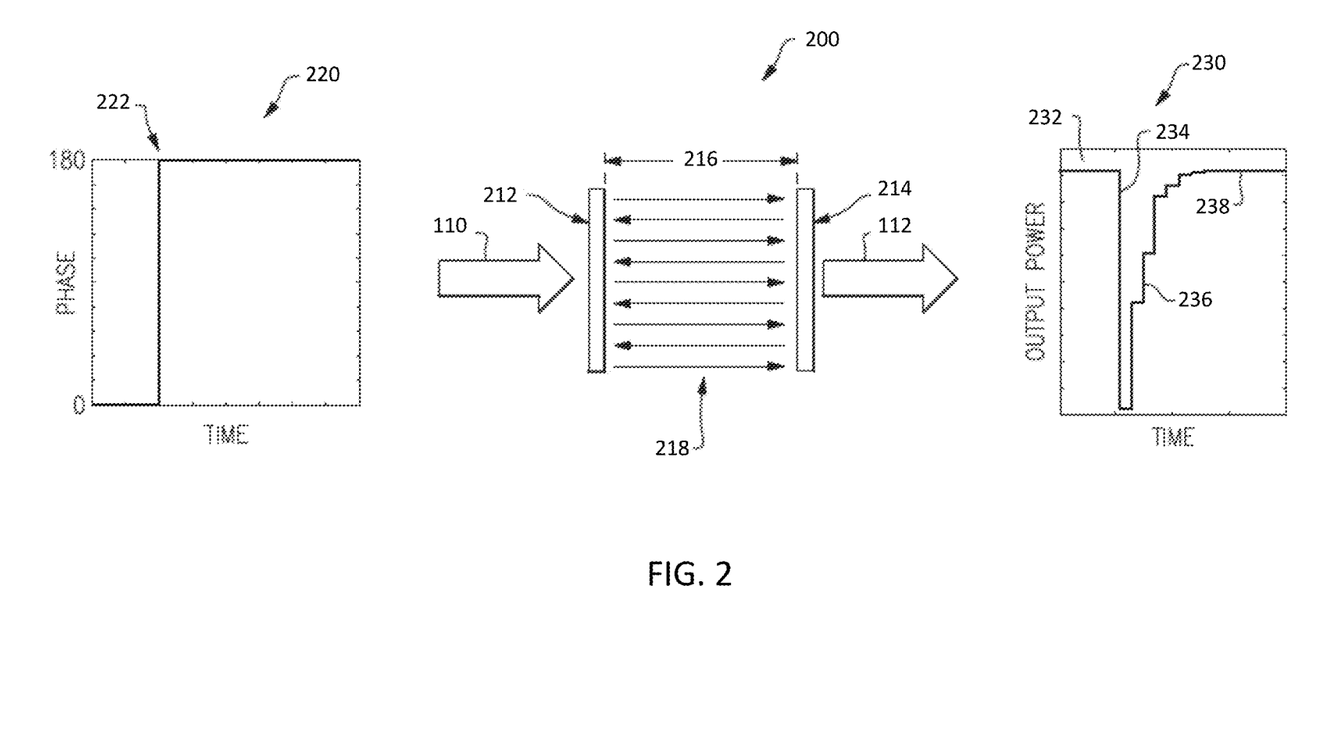
FIG. 2 is a diagram of an example of operation of an etalon in accordance with aspects described herein.
Figure 3:
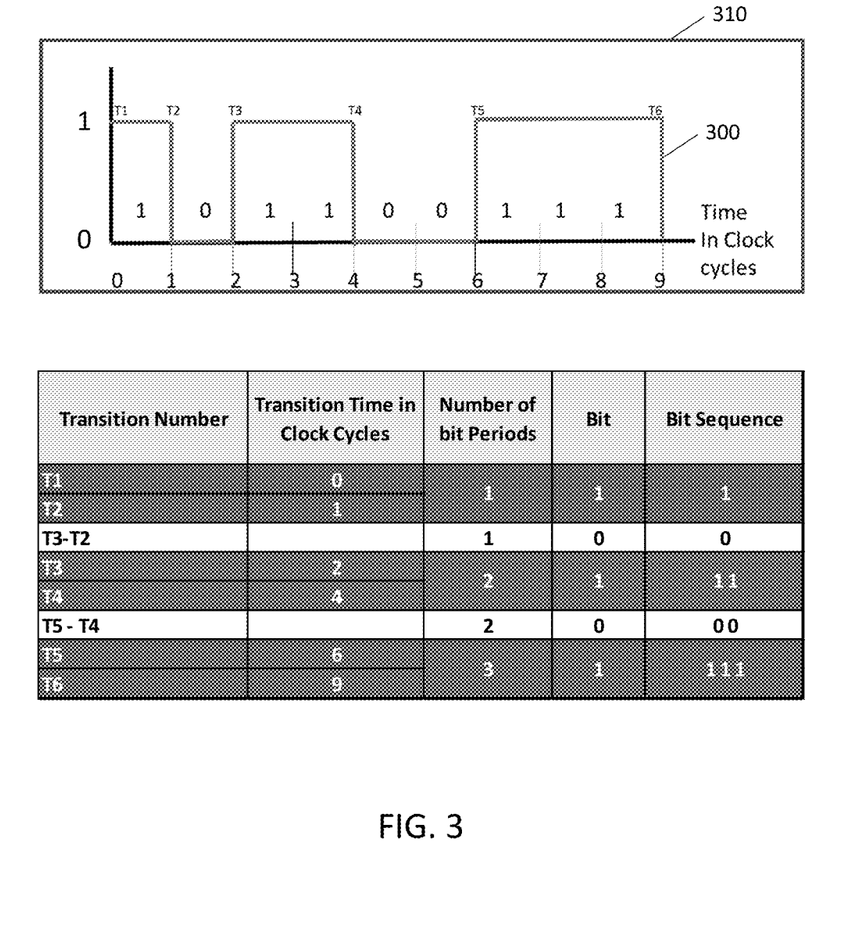
FIG. 3 is a graph of an example non-return-to-zero (NRZ) signal in accordance with aspects described herein.

As will be shown with reference to the aspects and embodiments of FIGS. 1-2, certain optical signal receivers include an optical resonator assembly, such as a Fabry-Perot resonator assembly, a micro-ring assembly, or a non-planar resonator assembly that is used to demodulate arriving optical signals. Using an optical resonator assembly in the demodulator may offer advantages over conventional demodulation techniques, including the ability to demodulate weak optical signals without a locally coherent clock source. In some cases, the arriving optical signals may be phase modulated. The optical resonator assembly converts a received phase modulated optical signal into a directly detectable intensity modulated output signal. It is appreciated that although the embodiment of FIGS. 1-2 is illustrated with respect to an optical receiver for an optical baseband signal, the receiver and method of this disclosure is independent of the originating carrier signal frequency and wavelength band, i.e. such as whether it is a light signal, an RF signal, or any frequency or wavelength. Likewise, while the examples herein with particular reference to FIGS. 1-2 illustrate receiving and processing an intensity signal representing the phase of a phase modulated optical baseband signal, it is appreciated that different types of modulation techniques can be used with various frequency and wavelength signals, and the resulting encoded baseband signal can be analyzed by the processing system 400 to determine and store (recover) encoded data from the encoded baseband signal resulting from various types of modulated signals.

FIG. 1 is a block diagram of one example of an optical receiver in accordance with aspects described herein. The optical receiver 100 receives a modulated optical signal 110 transmitted along a free space signal path (e.g., free space optical, FSO), a fiber coupling, or another waveguide system from a transmitter (not shown). The optical receiver 100 includes a demodulator 120 that includes an optical resonator assembly 125, a detector assembly 130 including at least one optical-electrical converter (OEC) 135, and a signal processing circuit 140. In certain examples, the detector assembly 130 and the signal processing circuit 140 may be collectively referred to as a detector. The detector assembly 130 and the signal processing circuit 140 may be separate components or may be part of a common module. The optical resonator assembly 125 is positioned to receive the modulated optical signal 110 and to produce an output optical signal 112 that has amplitude characteristics representative of the modulation of the modulated optical signal 110, as discussed further below. The detector assembly 130 receives the output optical signal 112 from the optical resonator assembly 125 and the at least one OEC 135 converts the optical signal 112 into an electrical signal 114 that can be processed by the signal processing circuit 140 to produce a decoded information signal 116. The decoded information signal 116 may include the information that was encoded on the modulated optical signal 110 by the modulation of the modulated optical signal 110. The OEC 135 may include one or more photodiodes, for example, or other components capable of transforming an optical signal into an electrical signal. The signal processing circuit 140 may include various components, as will be understood by those skilled in the art, such as analog-to-digital converters, filters, amplifiers, controllers, etc., to condition and process the electrical signals received from the detector assembly 130 to produce the decoded information signal 116. The optical receiver 100 may further include a controller 150 that may be coupled to the signal processing circuit 140 and to the optical resonator assembly 125 and configured to adjust parameters of the optical resonator assembly 125 to maintain a selected operating condition of the optical resonator assembly 125, so as to maintain alignment between the optical receiver 100 and a transmitting source of the modulated optical signal 110.

In certain examples, the optical resonator assembly 125 includes one or more optical resonators configured to convert the modulation of the modulated optical signal 110 into intensity modulation of the output optical signal 112. As noted above, the modulated optical signal 110 may be phase modulated. As used herein, the term "optical resonator" refers to a component capable of sensing variations, such as phase variations in the received optical signal 110. Examples of optical resonators may include Fabry-Perot etalons, micro-rings, Fizeau interferometers, Michelson Interferometers, or other types of optical resonators. Each optical resonator in the optical resonator assembly 125 converts the modulation of the arriving optical signal 110 in part by interaction of the arriving optical signal 110 with optical energy built-up in the resonator.

Operation of an optical resonator as a phase change detector is discussed below using the example of an etalon; however, those skilled in the art will appreciate that other types of optical resonators can be operated according to similar principles.

Referring to FIG. 2, in certain examples an etalon 200 is a component having a pair of parallel semi-reflective surfaces 212, 214 that may include an optically transparent material in between, and has a characteristic resonant frequency associated with a certain wavelength of light based upon the spacing (i.e., dimension 216) between the semi-reflective surfaces. The surfaces 212, 214 are semi-reflective and also semi-transmissive, in that they allow some light through, and therefore the arriving modulated optical signal 110 may be allowed into the etalon 200 and may resonate inside the etalon (i.e., in the interior 218 between the two semi-reflective surfaces 212, 214). Additionally, some of the light resonating inside is allowed out of the etalon 200 (through at least one of the semi-transmissive surfaces). Light emerging from the etalon 200 is shown, for example, as the output optical signal 112.

The optical signal 110 received by the etalon 200 establishes a steady-state energy-conserving condition in which optical signal energy continuously arrives at the etalon 200, adds to the built-up resonating energy existing inside the etalon 200, and emerges from the etalon 200 at a constant rate. If the phase of the arriving optical signal 110 changes, this change causes a temporary disruption to the resonance inside the etalon 200 and the light intensity emerging from the etalon 200 is also disrupted, until a steady state condition is re-established. Accordingly, a change in phase of the arriving optical signal 110 causes a change in intensity of the output optical signal 112. Thus, the etalon functions as a demodulator, or a modulation converter, for the optical signal 110. The output optical signal 112 may therefore carry the same information content as the arriving optical signal 110, but in an intensity modulated form, rather than a phase modulated form, for example.

FIG. 2 illustrates an example of the above-described operation of the etalon 200 in accordance with aspects described herein. FIG. 2 shows a graph 220 of the arriving modulated optical signal 110, showing a phase change in the optical signal 110. The graph 220 plots the phase (vertical axis) of the optical signal 110 over time (horizontal axis), showing a phase transition of pi (180 degrees) at point 222. FIG. 2 also shows a graph 230 of optical signal intensity (as output power) emerging from the etalon 200 during the phase transition in the received optical signal 110. At region 232 the etalon 200 is in a steady-state resonance condition wherein a steady intensity of light emerges. At point 234, corresponding to point 222 in the graph 220, a phase transition occurs in the arriving optical signal 110, temporarily disrupting the steady-state and causing a drop in the emerging light intensity. During successive reflections inside the etalon 200, and indicated region 236 in the graph 230, resonance is re-establishing, and the emerging light intensity increases until, at point 238, a steady intensity of light emerges when the etalon 200 has returned to a steady-state condition. Thus, variations in the intensity of the output optical signal 112 from the etalon 200 indicate that a transition occurred in the arriving optical signal 110, such as a phase transition due to phase modulation of the optical signal 110.

The etalon 200 may have varying levels of reflectivity of the semi-reflective surfaces 212, 214. In certain examples, the reflectivity may be expressed as a fraction of light amplitude reflected back into the interior 216 or may be expressed as a fraction of light intensity reflected back into the interior 216. The reflectivity of each of the first and second semi-reflective surfaces 212, 214 may be the same or different, and may be any suitable value for any implementation. The etalon 200 is one example of a suitable optical resonator in accord with aspects and embodiments described herein. However, the use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like. In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples.

Additionally, other optical resonators, such as an optical loop or micro-ring, for example, may operate according to similar principles and also be used in the optical resonator assembly 125. For example, optical signal energy accumulated in the loop/micro-ring may constructively or destructively interfere with itself, at certain frequencies (wavelengths), and such constructive or destructive interaction may be disturbed by a phase change in an arriving optical signal 110. Accordingly, phase changes in the arriving optical signal 110 may be detected and interpreted to demodulate the arriving optical signal 110. In the example shown in FIG. 2, the output intensity/power from the etalon 200 exhibits a transient disturbance that is a temporary reduction in power; however, in other configurations the transient disturbance may instead be a temporary increase in response to a phase (or amplitude or frequency) transition occurring in the arriving modulated optical signal 110.

The optical resonator assembly 125 may include one or more etalons 200, or other types of optical resonators that operate similarly to convert the modulation of the arriving optical signal 110 into the intensity-modulated output optical signal 112 which may then be detected and processed to recover the information encoded in the original optical signal 110.

As discussed above, the information may be contained in baseband data encoded in a spectrum reducing format, such as, for example, non-return-to-zero (NRZ). NRZ is a unipolar line coding scheme in which a positive voltage defines a one ('1') bit and a zero voltage defines a zero ('0') bit. The signal does not return to zero in the middle of the bit, and thus only changes state when there is a bit change. As described above, to recover the encoded information, the NRZ data can be digitized, stored, and processed. However, the digitization (i.e., sampling) and storage of such data can be voluminous and may require sizable amounts of storage space and processing power. For example, when digitizing NRZ data, the bytes to store per second is represented by equation (1) below:

$$\frac{Bytes}{Sec} = \frac{Bits}{Sec} * \frac{Number\ of\ Samples}{Bit} * \frac{Bits}{Sample} * \frac{1\ Byte}{8\ bits} \quad (1)$$

As such, or a 10 Gbps signal, the data to store per second may correspond to equation (2) below:

$$\frac{Bytes}{Sec} = \frac{10Gbps}{Sec} * \frac{2\ Samples}{Bit} * \frac{8\ Bits}{Sample} * \frac{1\ Byte}{8\ bits} = 20GBps \quad (2)$$

As shown, significant storage space may be needed to store the digitized data samples for further processing. In addition, analog-to-digital converters (ADC) and processors are often used to sample and store the digitized data, requiring additional components and increasing power consumption. Accordingly, an improved processing system and method are described herein that leverages the inherent transitions of the NRZ encoding to reduce the storage and power requirements needed for processing baseband data.

FIG. 3 illustrates an example NRZ signal 300 in accordance with aspects described herein. In one example, the NRZ signal 300 is an amplitude modulated signal. The graph 310 plots the amplitude (vertical axis) over time in clock cycles (horizontal axis) of the NRZ signal 300. As shown, the NRZ signal 300 has an amplitude of 1 at time T1. After one clock period, a falling transition to 0 occurs at time T2, indicating a bit sequence of '1' between times T2 and T1. After another clock period, a rising transition to 1 occurs at time T3, indicating a bit sequence of '0' between times T3 and T2. Likewise, after two clock periods, a falling transition back to 0 occurs at time T4, indicating a bit sequence of '11' between times T4 and T3. After another two clock periods, a rising transition back to 1 occurs at time T5, indicating a bit sequence of '00' between times T5 and T4. Similarly, after three clock cycles, a falling transition back to 0 occurs at time T6, indicating a bit sequence of '111' between times T6 and T5.

As described above, the transitions of the NRZ signal can be analyzed to recover the encoded information. In some examples, a reference clock can be used to count off the number of bit periods (i.e., clock cycles) between transitions to recover the encoded information. For example, the number of bit periods (or clock cycles) between rising edges and falling edges corresponds to the number of '1' bits in a bit sequence. Likewise, the number of bit periods (or clock cycles) between falling edges and rising edges corresponds to the number of '0' bits in a bit sequence.

Figure 4:
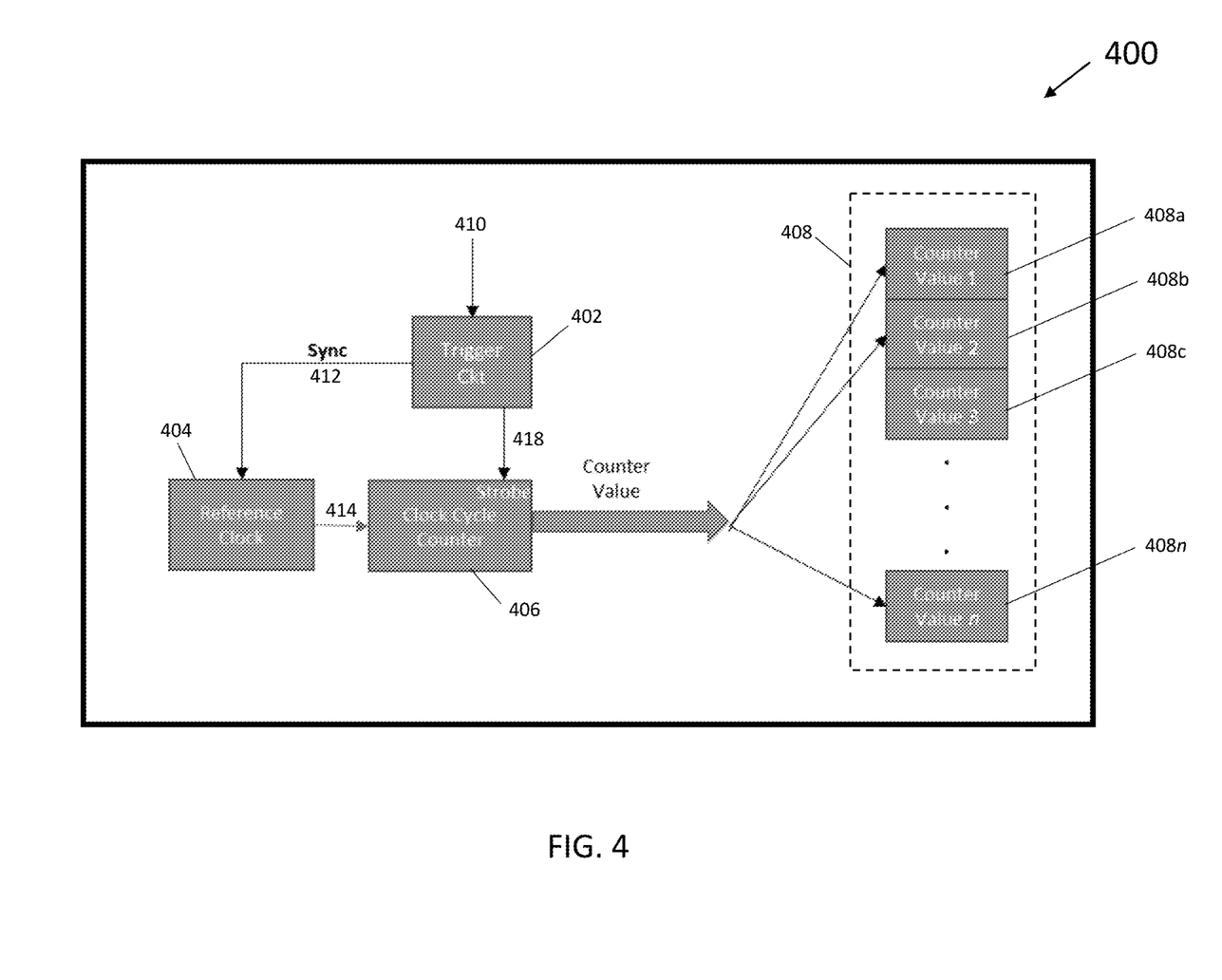
FIG. 4 is a block diagram of a processing system in accordance with aspects described herein.

While the NRZ signal 300 is an amplitude modulated signal, similar techniques can be applied to NRZ phase modulated signals. In some examples, the phase transitions of such phase modulated signals can be analyzed to recover encoded information (or data) without sampling or digitizing the phase modulated signal (or a signal representing the phase modulated signal). FIG. 4 illustrates a block diagram of a processing system 400 in accordance with aspects described herein. In some examples, the processing system 400 can be implemented using a processor, controller, and/or processing circuitry; however, in other examples, the processing system 400 can be included in another processor or controller (e.g., the signal processing circuit 140 of FIG. 1). In one example, the processing system 400 is configured to recover encoded information (or data) from a phase modulated NRZ signal. In some examples, the processing system 400 can be used to analyze an intensity signal representing the phase changes of a phase modulated signal (e.g., the output signal of the etalon 200 of FIG. 2 or an intensity modulated signal converted from a phase modulated RF signal with a phase to amplitude detector).

As shown, the processing system 400 includes a trigger circuit 402, a reference clock 404, a counter 406, and a counter list 408. In one example, at least one of the trigger circuit 402, the reference clock 404, and the counter 406 is implemented in a controller (e.g., the signal processing circuit 140). In some examples, the counter list 408 corresponds to at least one memory element or a portion of a memory element. The processing system 400 includes an input 410 configured to receive an analog input signal and provide the analog input signal to the trigger circuit 402. The trigger circuit 402 is configured to provide a sync signal to the reference clock 404 to sync the reference clock to the input signal. The reference clock 404 is configured to provide a reference clock signal 414 to the counter 406.

Figure 5:
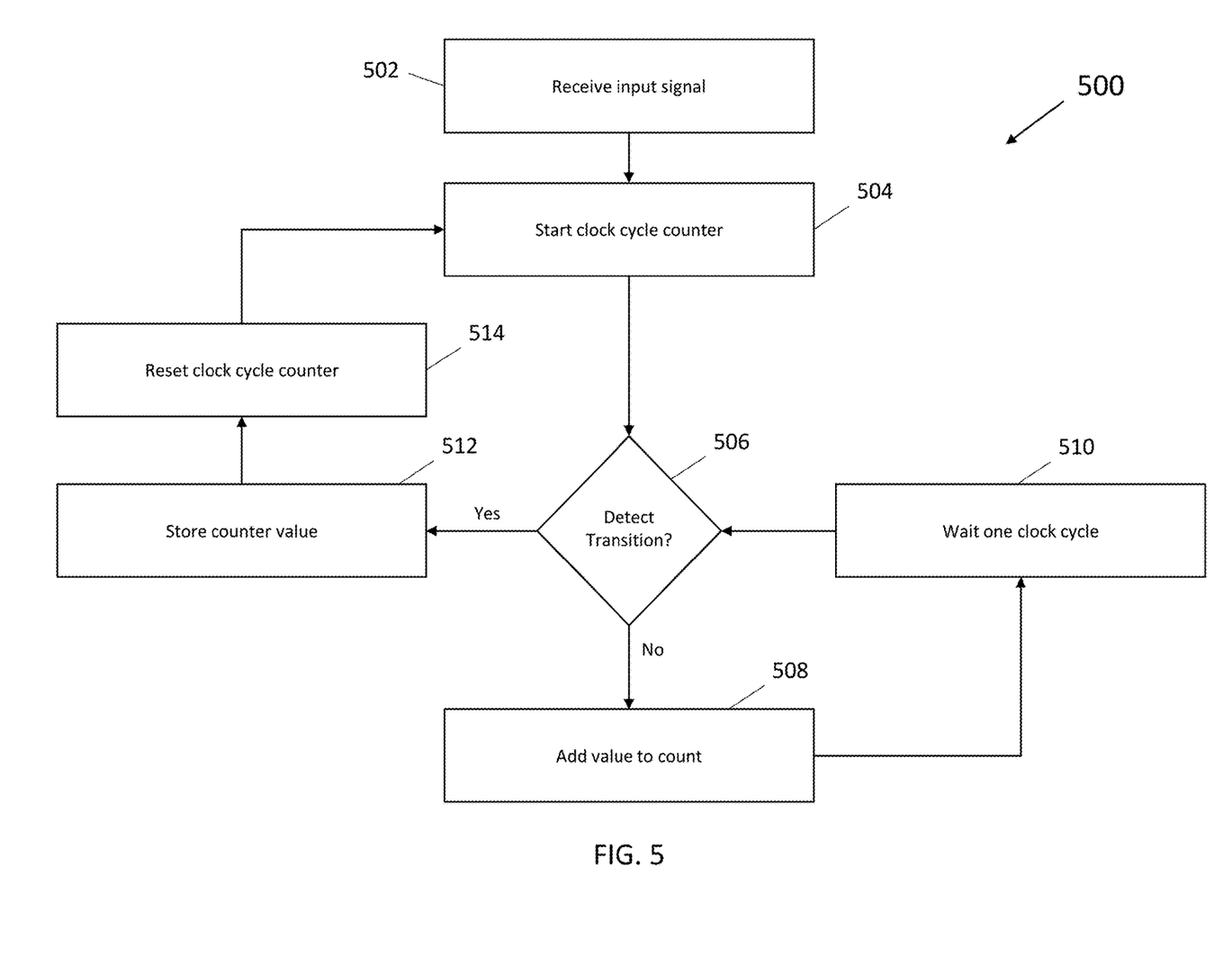
FIG. 5 is a flow diagram of a processing method in accordance with aspects described herein.

FIG. 5 illustrates a flow diagram of a processing method 500 in accordance with aspects described herein. In one example, the processing method 500 corresponds to the operation of the processing system 400 of FIG. 4.

At block 502, the processing system 400 receives the input signal at the input 410. As described above, the input signal may correspond to an intensity signal representing the phase changes of a phase modulated signal (e.g., the output signal of the etalon 200 of FIG. 2 or an intensity modulated signal converted from a phase modulated RF signal with a phase to amplitude detector). It is appreciated that while certain examples herein with particular reference to FIGS. 1-2 illustrate receiving and processing an intensity signal representing the phase of a phase modulated optical baseband signal, it is appreciated that different types of modulation techniques can be used with various frequency and wavelength signals, and the resulting encoded baseband signal can be analyzed by the processing system 400 to determine and store (recover) encoded data from the encoded baseband signal resulting from various types of modulated signals.

At block 504, the counter 406 begins counting the clock cycles of the reference clock signal 414. In one example, the frequency of the reference clock signal 114 (i.e., the length of the clock cycle) corresponds to the data rate of the data encoded in the input signal; however, in other examples, different clock frequencies can be used. In some examples, each clock cycle may correspond to one bit period; however, in other examples, each clock cycle may correspond to a different amount of time (e.g., half a bit period).

At block 506, the processing system 400 checks for a transition in the input signal. In one example, the trigger circuit 402 is configured to detect transitions (i.e., phase changes) in the input signal. In some examples, the transition corresponds to a change in intensity (or amplitude) of the input signal indicating a phase change.

At block 508, in response to no transition being detected, the counter 406 adds a value to the clock cycle count. At block 510, the processing system 400 waits for another clock cycle and then returns to block 506 to check for transitions in the input signal.

At block 512, in response to a transition being detected, the processing system 400 stores the clock cycle count in the counter value list 408. For example, the clock cycle count corresponding to the first detected transition is stored in the counter value list 408 as counter value 408a, the clock cycle count corresponding to the second detected transition is stored in the counter value list 408 as counter value 408b, and so on. In some examples, each clock cycle count stored in the counter value list 408 corresponds to a 1-byte data value.

At block 514, once the clock cycle count has been stored, the counter 406 is reset and the processing system 400 returns to block 504. In some examples, the processing method 500 continues until the input signal is completed or until no transitions are detected; however, in other examples, the processing method 500 may end based on different conditions (e.g., a pattern is detected in the data).

In some examples, the number of clock cycles between each transition (i.e., the counter values 408a-408n) can be used to recover the encoded information (or data) from the modulated signal. For example, if one clock cycle represents one bit period, then a counter value of 4 may correspond to a bit sequence of '1111' or '0000', if one clock cycle represents half a bit period, then a counter value of 4 may correspond to a bit sequence of '11' or '00', and so on. In one example, if the first data bit of the decoded data is a '1', then odd list entries in the counter value list 408 correspond to 1-bits and even list entries in the counter value list 408 correspond to 0-bits. For example, if the counter value 408a corresponds to a 1-bit sequence (e.g., '1', '11', '111', etc.) then the counter value 408b corresponds to a 0-bit sequence (e.g., '0', '00', '000', etc.), and so on. Likewise, if the first data bit of the decoded data is a '0', then odd list entries in the counter value list 408 correspond to 0-bits and even list entries in the counter value list 408 correspond to 1-bits. For example, if the counter value 408a corresponds to a 0-bit sequence (e.g., '0', '00', '000', etc.) then the counter value 408b corresponds to a 1-bit sequence (e.g., '1', '11', '111', etc.), and so on. In some examples, a known pattern in the data can be used to determine if the first data bit is a '1' or '0'.

In some examples, the stored values (i.e., the counter values 408a-408n) can be used to reconstruct the decoded data. To reconstruct the data during post-processing, each of the counter values 408a-408n can be divided by the frequency of the reference clock signal 114 to calculate an interval duration for each of the counter values 408a-408n. The calculated interval durations can be multiplied by the data rate (i.e., inverse of the bit period) of the phase modulated baseband signal to yield the number of bits in each sequence.

Figure 6A:
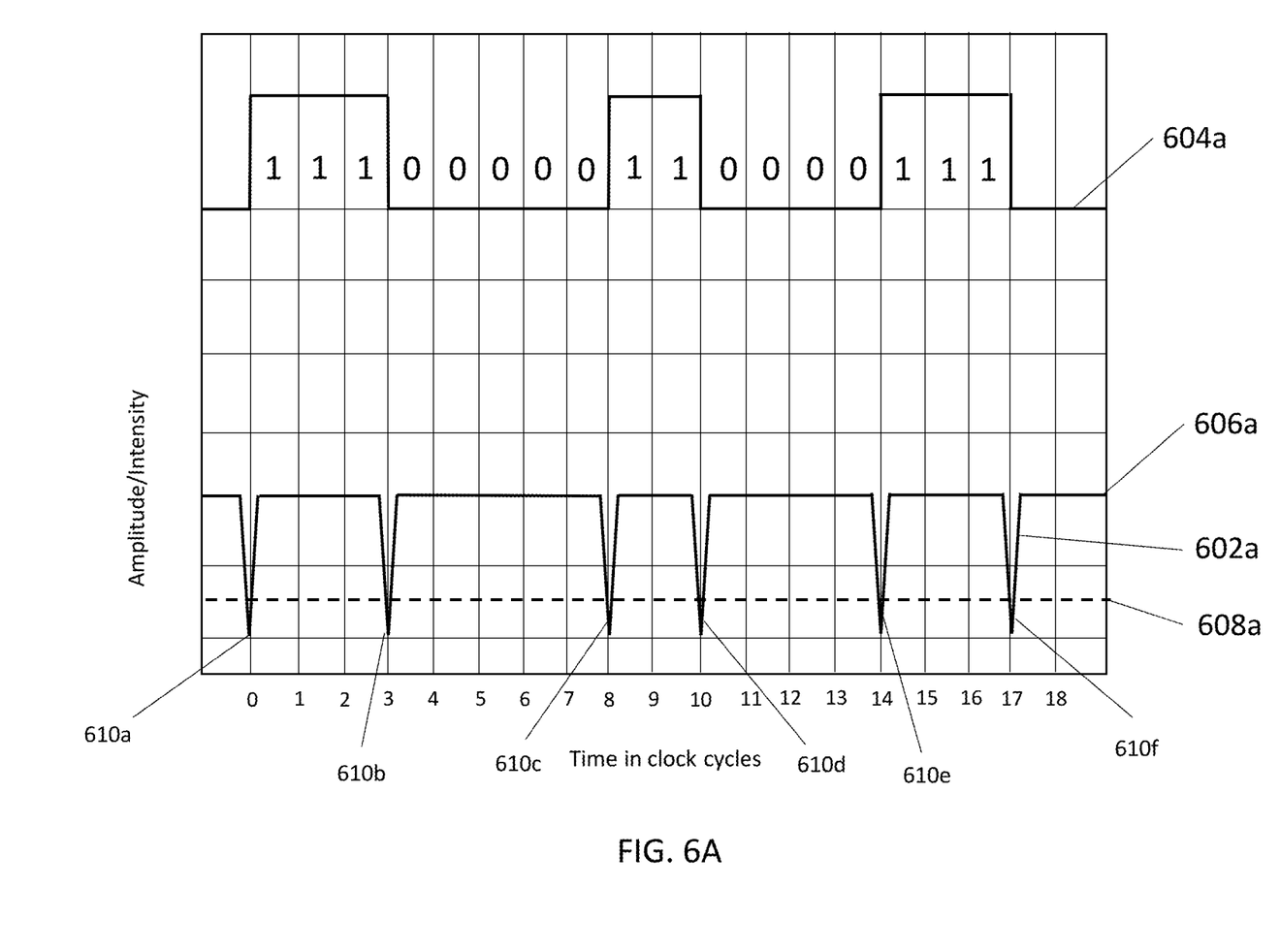
FIGS. 6A-6C are diagrams of example signals in accordance with aspects described herein.
Figure 6B:
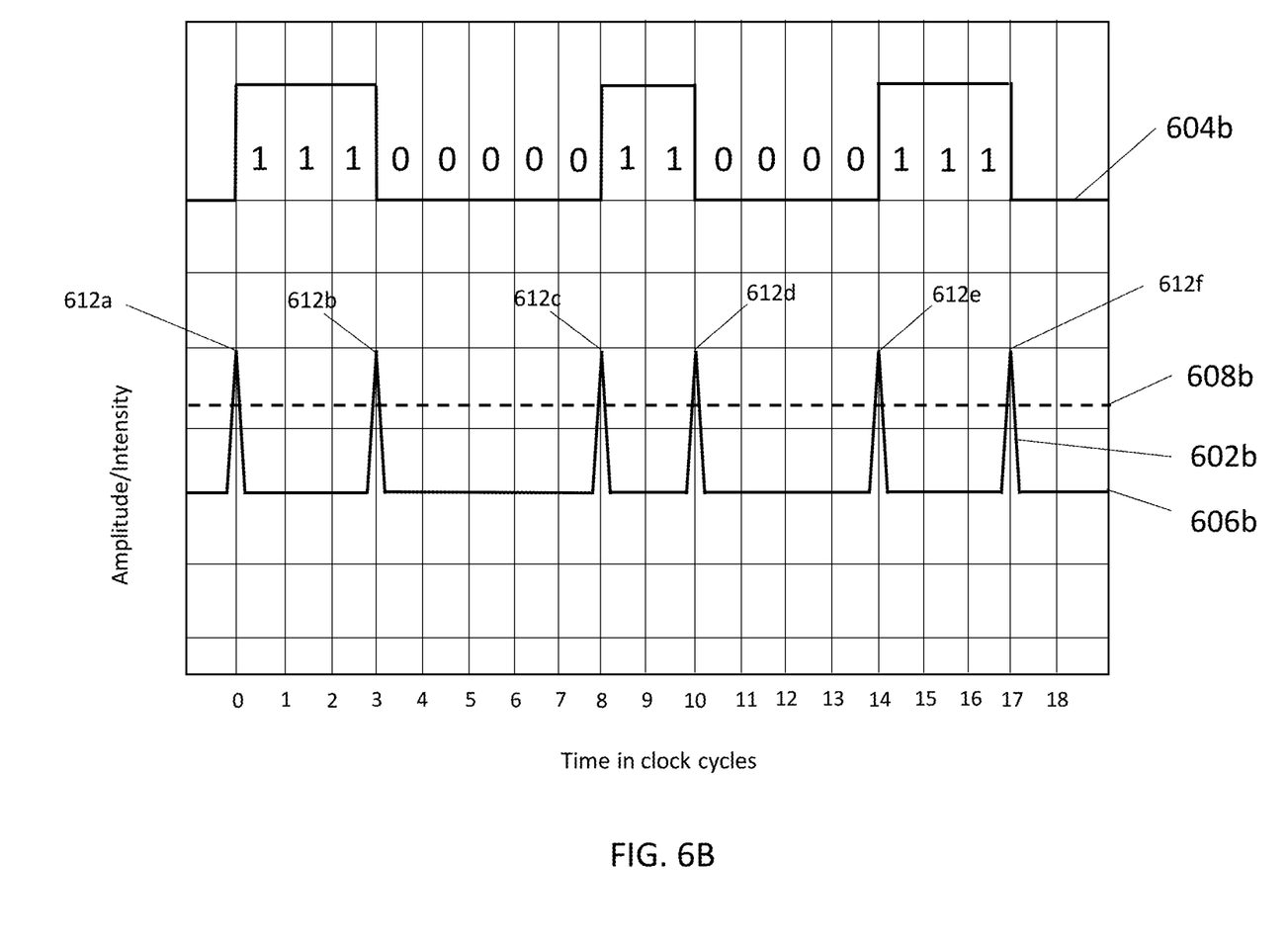
Figure 6C:
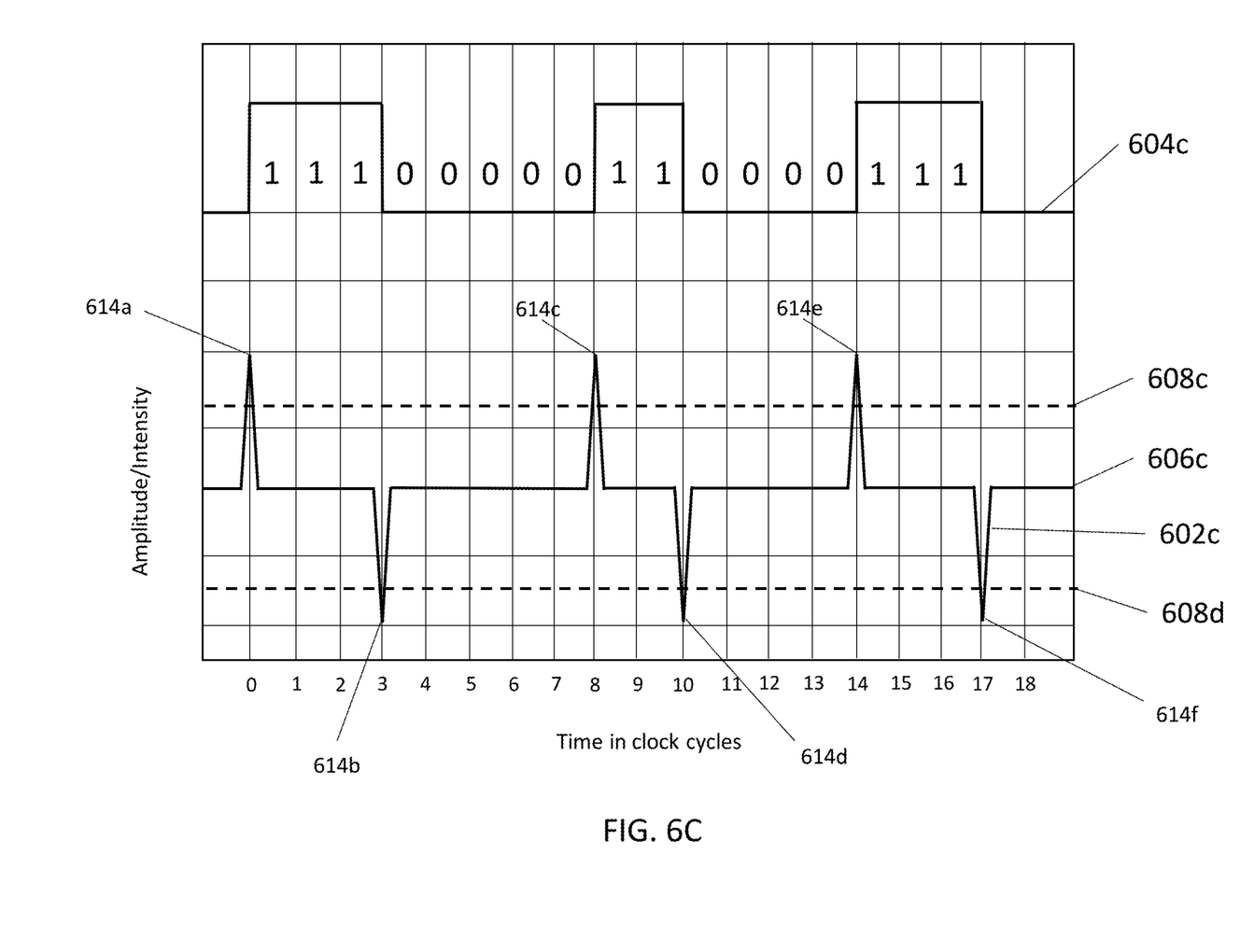

FIGS. 6A-6C illustrate several example signals that can be analyzed using the processing system 400 and the processing method 500 in accordance with aspects described herein.

FIG. 6A includes an intensity signal 602a and a data signal 604a. The graph plots the amplitude (vertical axis) over time in clock cycles (horizontal axis) of the intensity signal 602a. In one example, the intensity signal 602a corresponds to the input signal received at the input 410 of the processing system 400. In some examples, the intensity signal 602a represents the output signal of the etalon 200 of FIG. 2 or an intensity modulated signal converted from a phase modulated RF signal with a phase to amplitude detector. It is appreciated that although the embodiment of FIGS. 1-2 is illustrated with respect to an optical receiver for an optical baseband signal, the receiver and method of this disclosure is independent of the originating carrier signal frequency and wavelength band, i.e. such as whether it is a light signal, an RF signal, or any frequency or wavelength. Likewise, while the examples herein with particular reference to FIGS. 1-2 illustrate receiving and processing an intensity signal representing the phase of a phase modulated optical baseband signal, it is appreciated that different types of modulation techniques can be used with various frequency and wavelength signals, and the resulting encoded baseband signal can be analyzed by the processing system 400 to determine and store (recover) encoded data from the encoded baseband signal resulting from various types of modulated signals. As shown, the etalon 200 may be tuned such that when a phase change occurs in the optical signal, there is a corresponding transition (temporary decrease) from the steady state level 606a in the intensity signal 602a.

In one example, the trigger circuit 402 is configured to detect transitions in the intensity signal 602a that reach a trigger threshold 608a. Once a transition is detected, the counter 406 is stopped and the corresponding clock cycle count is stored in the counter value list 408. The counter 406 is then reset and starts counting clock cycles until another transition reaches the trigger threshold 608a.

The data signal 604a corresponds to the information (or data) recovered from the input signal 602a. The data signal 604a may be constructed in real-time using the processing system 400 and/or can be reconstructed from the counter value list 408 via post-processing, as described above. For illustration purposes, it can be assumed that one clock cycle corresponds to one bit period. As shown, a first transition 610a occurs at clock cycle 0 and a second transition 610b occurs at clock cycle 3, corresponding to a counter value of 3 and a bit sequence of '111'. At clock cycle 8, a third transition 610c occurs, corresponding to a counter value of 5 and a bit sequence of '00000' between the second and third transitions 610b, 610c. Likewise, a fourth transition 610d occurs at clock cycle 10, corresponding to a counter value of 2 and a bit sequence of '11' between the third and fourth transitions 610c, 610d, and so on.

FIG. 6B includes an intensity signal 602b and a data signal 604b. The graph plots the amplitude (vertical axis) over time in clock cycles (horizontal axis) of the intensity signal 602b. In one example, the intensity signal 602b corresponds to the input signal received at the input 410 of the processing system 400. In some examples, the intensity signal 602b represents the output signal of the etalon 200 of FIG. 2 or an intensity modulated signal converted from a phase modulated RF signal with a phase to amplitude detector. It is appreciated that although the embodiment of FIGS. 1-2 is illustrated with respect to an optical receiver for an optical baseband signal, the receiver and method of this disclosure is independent of the originating carrier signal frequency and wavelength band, i.e. such as whether it is a light signal, an RF signal, or any frequency or wavelength. Likewise, while the examples herein with particular reference to FIGS. 1-2 illustrate receiving and processing an intensity signal representing the phase of a phase modulated optical baseband signal, it is appreciated that different types of modulation techniques can be used with various frequency and wavelength signals, and the resulting encoded baseband signal can be analyzed by the processing system 400 to determine and store (recover) encoded data from the encoded baseband signal resulting from various types of modulated signals. As shown, the etalon 200 may be tuned such that when a phase change occurs in the optical signal, there is a corresponding transition (temporary increase) from the steady state level 606b in the intensity signal 602b.

In one example, the trigger circuit 402 is configured to detect transitions in the intensity signal 602b that reach a trigger threshold 608b. Once a transition is detected, the counter 406 is stopped and the corresponding clock cycle count is stored in the counter value list 408. The counter 406 is then reset and starts counting clock cycles until another transition reaches the trigger threshold 608b.

The data signal 604b corresponds to the information (or data) recovered from the input signal 602b. The data signal 604b may be constructed in real-time using the processing system 400 and/or can be reconstructed from the counter value list 408 via post-processing, as described above. For illustration purposes, it can be assumed that one clock cycle corresponds to one bit period. As shown, a first transition 612a occurs at clock cycle 0 and a second transition 612b occurs at clock cycle 3, corresponding to a counter value of 3 and a bit sequence of '111'. At clock cycle 8, a third transition 612c occurs, corresponding to a counter value of 5 and a bit sequence of '00000' between the second and third transitions 612b, 612c. Likewise, a fourth transition 612d occurs at clock cycle 10, corresponding to a counter value of 2 and a bit sequence of '11' between the third and fourth transitions 612c, 612d, and so on.

FIG. 6C includes an intensity signal 602c and a data signal 604c. The graph plots the amplitude (vertical axis) over time in clock cycles (horizontal axis) of the intensity signal 602c. In one example, the intensity signal 602c corresponds to the input signal received at the input 410 of the processing system 400. In some examples, the intensity signal 602c represents the output signal of the etalon 200 of FIG. 2 or an intensity modulated signal converted from a phase modulated RF signal with a phase to amplitude detector. It is appreciated that although the embodiment of FIGS. 1-2 is illustrated with respect to an optical receiver for an optical baseband signal, the receiver and method of this disclosure is independent of the originating carrier signal frequency and wavelength band, i.e. such as whether it is a light signal, an RF signal, or any frequency or wavelength. Likewise, while the examples herein with particular reference to FIGS. 1-2 illustrate receiving and processing an intensity signal representing the phase of a phase modulated optical baseband signal, it is appreciated that different types of modulation techniques can be used with various frequency and wavelength signals, and the resulting encoded baseband signal can be analyzed by the processing system 400 to determine and store (recover) encoded data from the encoded baseband signal resulting from various types of modulated signals. As shown, the etalon 200 may be tuned such that when a phase change occurs in the optical signal, there is a corresponding transition (temporary increase or decrease) from the steady state level 606c in the intensity signal 602c. In some examples, the transition may indicate a rising or falling edge in the encoded data.

In one example, the trigger circuit 402 is configured to detect transitions in the intensity signal 602c that reach a first trigger threshold 608c or a second trigger threshold 608d. Once a transition is detected, the counter 406 is stopped and the corresponding clock cycle count is stored in the counter value list 408. The counter 406 is then reset and starts counting clock cycles until another transition reaches the trigger thresholds 608c, 608d. The trigger circuit 402 may be configured to monitor the phase of an optical/electrical signal directly or indirectly. In some cases, additional circuitry may be included in the processing system 400, such as a phase detector(s).

The data signal 604c corresponds to the information (or data) recovered from the input signal 602c. The data signal 604c may be constructed in real-time using the processing system 400 and/or can be reconstructed from the counter value list 408 via post-processing, as described above. For illustration purposes, it can be assumed that one clock cycle corresponds to one bit period. As shown, a first transition 614a occurs at clock cycle 0 and a second transition 614b occurs at clock cycle 3, corresponding to a counter value of 3 and a bit sequence of '111'. At clock cycle 8, a third transition 614c occurs, corresponding to a counter value of 5 and a bit sequence of '00000' between the second and third transitions 614b, 614c. Likewise, a fourth transition 614d occurs at clock cycle 10, corresponding to a counter value of 2 and a bit sequence of '11' between the third and fourth transitions 614c, 614d, and so on.

While the examples above describe recovering encoded information (or data) from an optical signal, it should be appreciated that the processing system 400 and/or the processing method 500 can be used with different types of signals, that the receiver and method of this disclosure is independent of the originating carrier signal frequency and wavelength band, i.e. such as whether it is a light signal, an RF signal, or any frequency or wavelength. For example, the processing system 400 and/or the processing method 500 can be used to recover encoded information (or data) from electrical signals (e.g., radio-frequency signals). Likewise, while the examples herein with particular reference to FIGS. 1-2 illustrate receiving and processing an intensity signal representing the phase of a phase modulated optical baseband signal, it is appreciated that different types of modulation techniques can be used with various frequency and wavelength signals, and the resulting encoded baseband signal can be analyzed by the processing system 400 to determine and store (recover) encoded data from the encoded baseband signal resulting from various types of modulated signals.

In some examples, being that the processing system 400 and the processing method 500 are configured to recover encoded information without digitizing (or sampling) the signal, the storage and power requirements needed for processing baseband data can be reduced substantially. For example, storage requirements for a random 256 bit sequence are illustrated in Table 1 below:

TABLE 1

| Collection Method | Bytes Required | Increase Storage |
|---|---|---|
| Analog Phase Collection | 128 | 1× |
| 8 Bit Digital Sampling | 510 | 4× |

TABLE 1-continued

| Collection Method | Bytes Required | Increase Storage |
| --- | --- | --- |
| 12 Bit Digital Sampling | 765 | 6× |
| 16 Bit Digital Sampling | 1020 | 8× |

In one example, the analog phase collection method corresponds to the processing system 400 and the processing method 500. Likewise, the digital sampling collection methods correspond to collection methods that require signal digitization (e.g., via an ADC). As shown in Table 1, the considerable storage reductions can be realized by using the analog phase collection method (i.e., the processing system 400 and/or the processing method 500). In some examples, the storage requirements for the analog collection method may be up to 80% less than the digital sampling collection methods. In certain examples, being that there is no ADC used and a lower byte count to process/store in the analog collection method, power consumption can be reduced.

As described above, apparatuses, systems, and methods for reducing and compressing non-return-to-zero (NRZ) data are provided herein. In at least one embodiment, the processing systems and methods are configured to leverage the inherent transitions of NRZ encoding to reduce the storage and power requirements needed for processing baseband data.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A method for efficiently determining and storing encoded data from an encoded baseband signal, comprising:
   receiving an encoded baseband signal;
   detecting a first transition of intensity of the encoded baseband signal indicating a first change in the data of the encoded baseband signal;
   detecting a second transition of intensity of the encoded baseband signal indicating a second change in the data of the encoded baseband signal;
   counting, via a counter, clock cycles of a reference clock between the first transition and the second transition;
   storing a first counter value corresponding to an amount of clock cycles elapsed between detecting the first transition and the second transition; and
   determining a binary-valued bit sequence corresponding to the first counter value.

2. The method of claim 1, further comprising:
   detecting a third transition of intensity of the encoded baseband signal indicating a third change in the data of the encoded baseband signal;
   storing a second counter value corresponding to an amount of clock cycles elapsed between the second transition and the third transition; and
   determining a binary-valued bit sequence corresponding to the second counter value.

3. The method of claim 1, wherein receiving the encoded baseband signal includes receiving an intensity modulated signal representing a phase of a phase modulated signal that has been output from a phase to amplitude detector.

4. The method of claim 1, wherein the encoded baseband signal is a baseband optical signal and wherein receiving the encoded baseband signal includes receiving an intensity modulated optical signal representing a phase of a phase modulated signal that has been output from an etalon.

5. The method of claim 1, wherein detecting the first transition of the encoded baseband signal includes detecting intensity deviations from a steady state level of the intensity modulated signal.

6. The method of claim 1, wherein determining the binary-valued bit sequence corresponding to the first counter value includes dividing the first counter value by a frequency of the reference clock to provide an interval duration and multiplying the interval duration by a data rate of the encoded baseband signal.

7. The method of claim 1, wherein storing the first counter value corresponding to the amount of clock cycles elapsed between receiving the first transition and the second phase transition includes storing a 1-byte data value representing the first counter value.

8. The method of claim 1, wherein receiving the encoded baseband includes receiving an intensity modulated signal representing a phase of a phase modulated signal encoded with non-return-to-zero (NRZ) data and further comprising recovering the encoded non-return-to-zero (NRZ) data from the binary-valued bit sequence.

9. A processing system for recovering encoded data from an encoded baseband signal, comprising:
   a detector having an input that receives the encoded baseband signal and that provides an output signal at an output;
   a reference clock circuit configured to provide a reference clock;
   a counter circuit configured to count clock cycles of the reference clock;
   a trigger circuit coupled to the output of the detector that is configured to detect at least a first transition in intensity and a second transition in intensity of the encoded baseband signal indicating a first change in data and a second change in data of the encoded baseband signal;
   at least one memory element configured to store a first counter value corresponding to an amount of clock cycles elapsed between receiving the first transition and the second transition; and
   a controller configured to determine a binary-valued bit sequence corresponding to the first counter value.

10. The processing system of claim 9, wherein the trigger circuit is further configured to detect a third transition of the encoded baseband signal indicating a third change in data of the encoded baseband signal.

11. The processing system of claim 10, wherein the at least one memory element is further configured to store a second counter value corresponding to an amount of clock cycles elapsed between the second transition and the third transition.

12. The processing system of claim 11, wherein the controller is further configured to determine a binary-valued bit sequence corresponding to the second counter value.

13. The processing system of claim 9, wherein the encoded baseband signal represents a phase of a phase modulated signal that includes encoded non-return-to-zero (NRZ) data and the encoded non-return-to-zero (NRZ) data is recovered from the binary-valued bit sequence.

14. The processing system of claim 9, wherein the encoded baseband signal includes an intensity modulated signal representing a phase of a phase modulated signal that has been output from a phase to amplitude detector.

15. The processing system of claim 9, wherein the encoded baseband signal is an intensity modulated optical signal representing a phase of a phase modulated signal that has been output from an etalon.

16. The processing system of claim 9, wherein the trigger circuit is configured to detect the first transition in intensity and the second transition in intensity of the encoded baseband signal indicating the first change in data and a second change in data of the encoded baseband signal by detecting an intensity deviation from a steady state level of the intensity modulated signal.

17. The processing system of claim 9, wherein the controller is configured to determine the binary-valued bit sequence corresponding to the first counter value by dividing the first counter value by a frequency of the reference clock to provide an interval duration and multiplying the interval duration by a data rate of the encoded baseband signal.

18. The processing system of claim 9, wherein the at least one memory element is configured to store a 1-byte data value representing the first counter value.

19. The processing system of claim 9, wherein at least one of the reference clock circuit, the counter circuit, and the trigger circuit is implemented on the controller.

20. A non-transitory computer readable medium comprising code which, when executed by at least one processor, controls the at least one processor to:
process a detected signal provided by a detector detected from an input encoded baseband signal;
determine from the detected signal a first transition in intensity of the encoded baseband signal indicating a first change in data of the encoded signal;
determine from the detected signal a second transition in intensity of the encoded baseband signal indicating a second change in data the encoded baseband signal;
count, via a counter, clock cycles of a reference clock, store a first counter value corresponding to an amount of clock cycles elapsed between receiving the first transition and the second transition; and
determine a binary-valued bit sequence corresponding to the first counter value.

21. The non-transitory computer readable medium of claim 20, wherein the code, when executed by the at least one processor, controls the at least one processor to:
detect a third transition of the detected signal indicating a third change in data of the encoded baseband signal;
store a second counter value corresponding to an amount of clock cycles elapsed between the second transition and the third transition; and
determine a binary-valued bit sequence corresponding to the second counter value.

22. The non-transitory computer readable medium of claim 20, wherein the code, when executed by the at least one processor, controls the at least one processor to:
detect the first transition and the second transition of the encoded baseband signal by detecting intensity deviations from a steady state level of the intensity modulated signal.

23. The non-transitory computer readable medium of claim 20, wherein the encoded baseband signal includes encoded non-return-to-zero (NRZ) data and wherein the code, when executed by the at least one processor, controls the at least one processor recover the encoded non-return-to-zero (NRZ) data from the binary-valued bit sequence.

24. The non-transitory computer readable medium of claim 20, wherein the code, when executed by the at least one processor, controls the at least one processor to:
determining the binary-valued bit sequence corresponding to the first counter value by dividing the first counter value by a frequency of the reference clock to provide an interval duration and multiplying the interval duration by a data rate of the encoded baseband signal.

25. The non-transitory computer readable medium of claim 20, wherein the code, when executed by the at least one processor, controls the at least one processor to:
store the first counter value corresponding to the amount of clock cycles elapsed between detecting the first transition and the second transition as a 1-byte data value representing the first counter value.

* * * * *